No. 760,504. PATENTED MAY 24, 1904.
W. N. WHITELY.
CROP GATHERING AND DISCHARGING ATTACHMENT FOR HARVESTERS.
APPLICATION FILED JAN. 28, 1904.
NO MODEL. 2 SHEETS—SHEET 1.
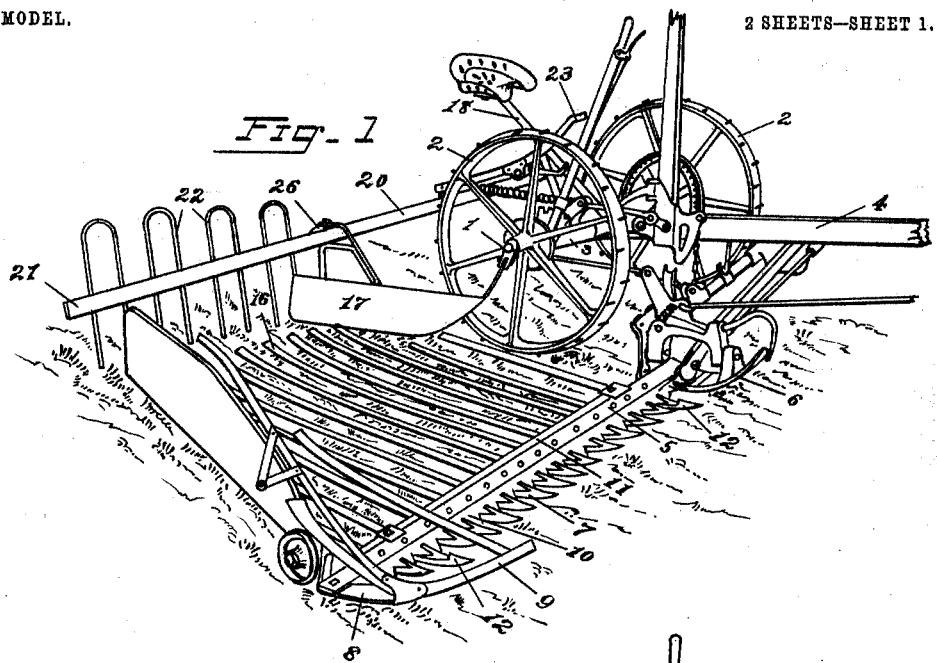
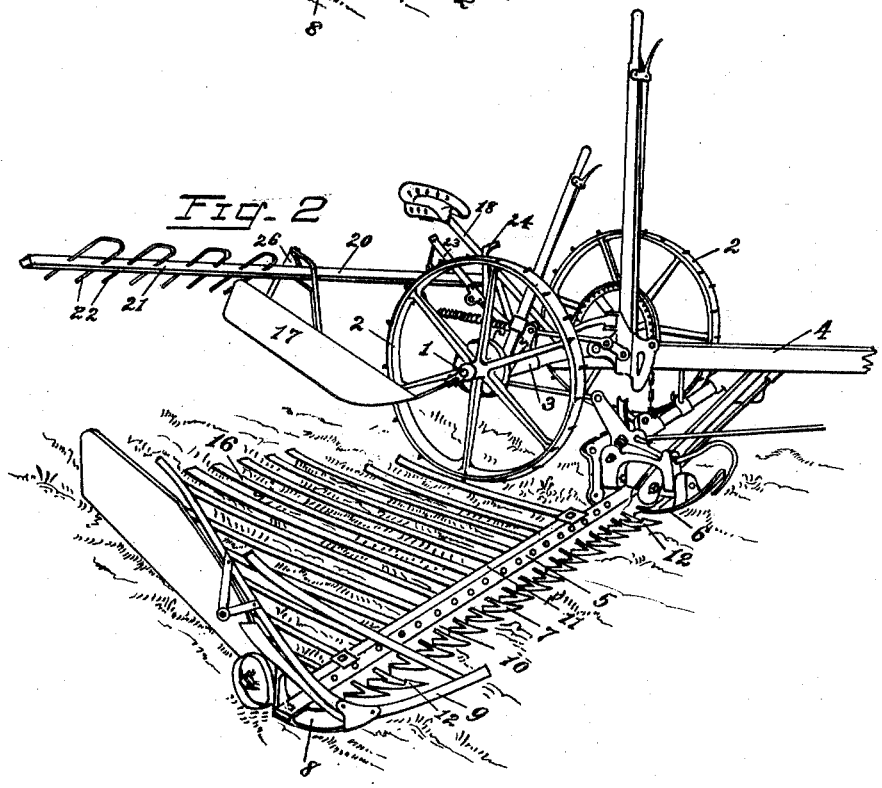
WITNESSES:
Robert Weiskotten
John L. Gilligan
INVENTOR.
William N. Whitely

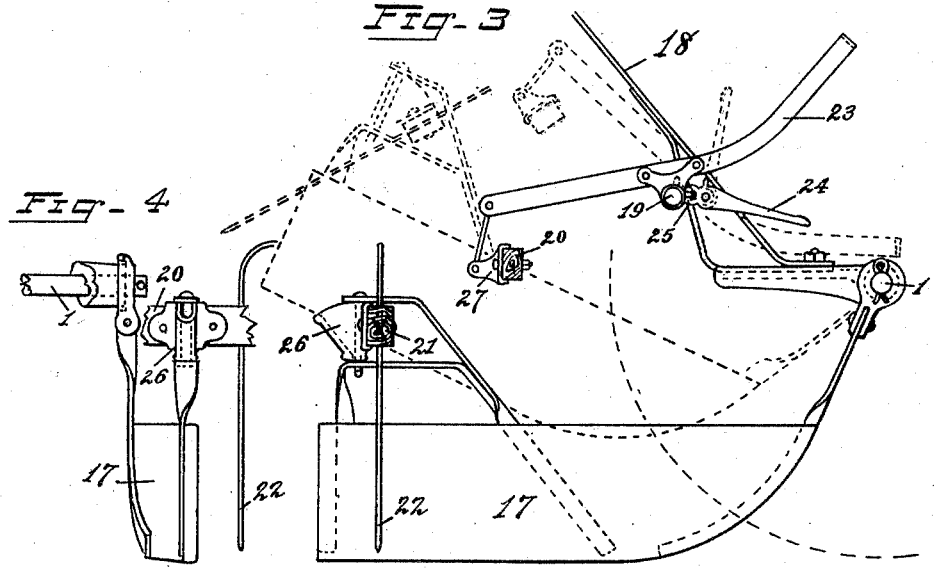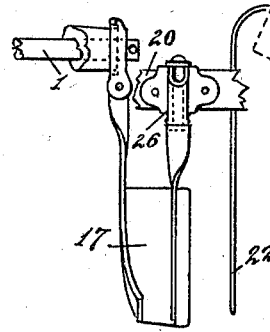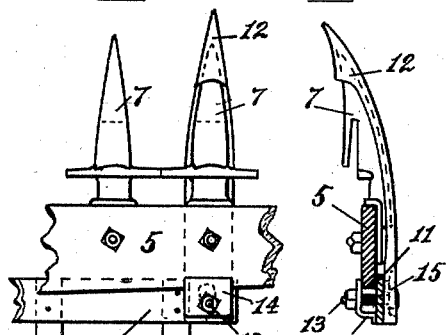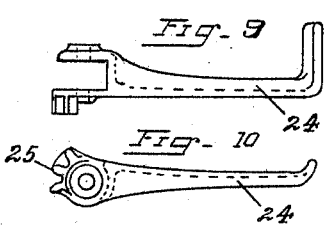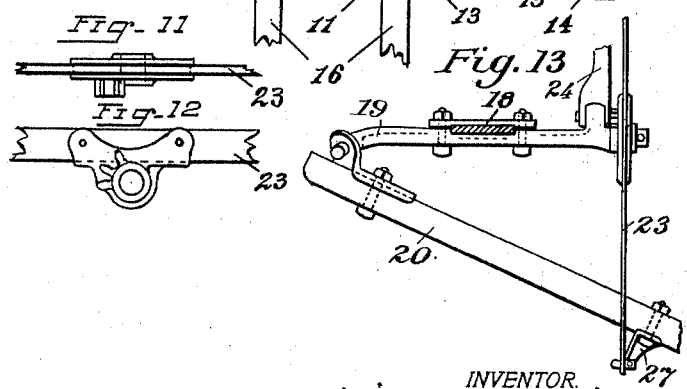

No. 760,504. Patented May 24, 1904.

UNITED STATES PATENT OFFICE.

WILLIAM N. WHITELY, OF SPRINGFIELD, OHIO.

CROP GATHERING AND DISCHARGING ATTACHMENT FOR HARVESTERS.

SPECIFICATION forming part of Letters Patent No. 760,504, dated May 24, 1904.

Application filed January 28, 1904. Serial No. 191,072. (No model.)

*To all whom it may concern:*

Be it known that I, WILLIAM N. WHITELY, a citizen of the United States, residing at No. 153 East High street, Springfield, in the county of Clark and State of Ohio, have invented certain new and useful Improvements in Crop Gathering and Discharging Attachments for Harvesters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in crop gathering and discharging attachments for harvesters, and is more particularly applicable to mowing-machines, and can be attached to the different makes of mowing-machines in use.

The principal object of my invention is to provide an attachment for harvesters whereby grain and grass crops when cut may be gathered, collected, and deposited at the will of the operator either in bunches or in windrows in the wake of the machine instead of being allowed to drop on the ground as cut, as is the case when harvested with a mowing-machine not equipped with my improvements.

I accomplish the objects of my invention by the mechanism illustrated in the accompanying drawings, in which—

Figure 1 is a perspective view of a mowing-machine equipped with my improvements, showing the radius-bar and rake-down and the teeth standing vertically to collect and hold the accumulating crop on the slatted platform. Fig. 2 is a perspective view of a mowing-machine equipped with my improvements, showing the radius-bar and rake raised and the teeth inclined toward a horizontal position for the free discharge of the crop from the slatted platform as the machine moves forward. Fig. 3 is a side elevation, partly in section, the heavy lines showing the rake and radius-bar down when collecting and holding the crop and the position of the lifting and holding mechanism and rake-teeth when the radius-bar and rake are in that position, the dotted lines showing the radius-bar and rake raised when discharging the crop and the position of the lifting and holding mechanism and rake-teeth when the radius-bar and rake are raised when discharging the accumulated cut crop from the slatted platform. Fig. 4 is a sectional detail rear elevation, showing the radius-bar and its connections to the main carrying-wheel axle and to the rake arm or head. Fig. 5 is a detail plan view, partly in section, showing the seat-support and supporting-bracket clamped to the seat-support for the stubbleward end of the rake-arm and lifting mechanism. Fig. 6 is a detail rear elevation, partly in section, showing the seat-support and supporting-bracket for the rake-arm and lifting mechanism. Fig. 7 is a sectional plan view showing a portion of the finger-bar, transverse bar, and slats secured to said transverse bar, also showing the guard-shoe fitting over the point of a guard-finger and extending rearwardly under the finger-bar to clamp and hold the transverse bar of the slatted platform to the finger-bar. Fig. 8 is a detail side elevation, partly in section, showing the guard-shoe fitting over the point of a guard-finger and extending rearwardly beneath the guard-finger and the manner of clamping and holding the guard-shoe and transverse bar of the slatted platform to the finger-bar. Fig. 9 is a detail plan view showing the holding-lever for the rake arm or head and the cog-teeth on same for engagement with the lifting-lever. Fig. 10 is a detail side elevation of same. Fig. 11 is a plan view showing a portion of the lifting-lever and cog-teeth thereon, with which the holding-lever engages. Fig. 12 is a detail side elevation of same. Fig. 13 is a sectional rear view showing the bracket secured to the machine and sufficient of the rake-arm to show its pivotal connection to said bracket.

Similar reference-numerals refer to similar parts throughout the several views.

In said drawings, 1 represents the main carrying-wheel axle. 2 2 represent the main driving and supporting wheels mounted upon and supporting said axle. 3 is the main frame mounted upon said axle 1 between said driving and supporting wheels 2 2 and upon which the driving-gears and operating parts of the machine are mounted.

4 represents the tongue, rigidly secured to the main frame 3, and by which the machine is propelled over the ground.

5 represents the finger-bar, which is rigidly connected to the main shoe 6, which is pivotally connected to the main frame 3.

7 represents a series of guard-fingers rigidly secured to the finger-bar 5. To the grassward end of said finger-bar 5 is rigidly secured the outer shoe 8, and to which is connected the divider-shoe 9 to divide and separate the crop to be cut in advance of the cutters.

Passing through the guard-fingers 7 is the reciprocating knife 10, which severs the stalks of the crop to be harvested as the machine moves forward.

Connected to the finger-bar 5 is the transverse bar 11, which is held to said finger-bar 5 by means of the guard-shoes 12 12, which fit over the point of a guard-finger 7 and extend rearwardly under said finger-bar 5 and transverse bar 11, as shown in detail in Fig. 8. Passing through the rearward end of the guard-shoe 12 and transverse bar 11 is a bolt 13, which engages a clamp-washer 14, as shown in detail in Figs. 7 and 8, said washer 14 being so formed that the rearward part of same engages with said transverse bar 11, while the forward portion engages with said finger-bar 5, and by means of said bolt 13 and clamp-washer 14 said guard-shoes 12 12 and transverse bar 11 are securely clamped to said finger-bar 5. The hole 15 in the rearward part of said guard-shoe 12, through which said bolt 13 passes, is made elongated, as shown in Fig. 8, so that said guard-shoes 12 12 may be attached and adjusted to finger-bars of varying widths. Rigidly secured to said transverse bar 11 is a series of rearwardly-projecting slats 16, which continuously slide upon the stubble, forming a slatted platform in the rear of the finger-bar 5 for the reception of the cut crop, said slats being elastic and each being free to rise and fall independently of the other or of the radius-bar 17, so as to follow the undulations of the ground. Said slats may be constructed of any kind, form, or shape of material desired.

Adjustably connected to the seat-support 18 is the supporting-bracket 19, to which the stubbleward end of the rake-arm 20 is pivotally connected. The rake-head 21 is provided with a series of downwardly-projecting teeth 22, as shown in Figs. 1 and 2, said rake-head 21 and teeth 22 being located rearward of and entirely free from the slats 16 of said platform.

Pivotally connected to the main carrying-wheel axle 1 is the radius-bar 17, which extends rearwardly and is connected to the rake-arm 20 or rake-head 21, as shown in Figs. 1 and 2, and while I show said radius-bar 17 pivotally connected to the main carrying-wheel axle 1 it may be connected to the grassward driving and supporting wheel 2 and accomplish the same result as when connected to the main carrying-wheel axle. It will be observed by reference to the drawings that the radius-bar 17 is adapted to slide on the stubble, so as to hold and maintain the teeth 22 of said rake 21 at any desired height from the ground, and being connected at its rearward end to said rake-arm 20 or rake-head 21 it partakes of the up and down movements of said arm 20 or rake-head 21 when gathering and discharging the cut crop from the slatted platform.

Pivotally mounted upon the grassward end of the supporting-bracket 19 is the lifting-lever 23, which extends rearwardly and pivotally connects with the rearwardly-extending bracket 27, which is secured to said rake-arm 20, as shown in Fig. 3. Said lifting-lever 23 may be operated by the hand or foot, as desired, and by means of said lifting-lever 23 and its pivotal connections to said rake-arm 20 said rake-arm 20 and rake-head 21 may be rolled, as shown in Fig. 2, to incline the teeth 22 of said rake-head 21 toward a horizontal position and raised, as shown in dotted lines in Figs. 2 and 3, to allow said teeth 22 to pass over the accumulated cut crop in an oblique direction when said rake-arm 20 and rake-head 21 are raised to discharge the crop from the slatted platform, and by releasing said lifting-lever 23 said rake-arm 20 and rake-head 21 drop down and assume their normal position, as shown in Figs. 1 and 3, and by means of the lever 24, which is pivotally connected to the machine and engages with said lifting-lever 23 by means of the cog-teeth 25, as shown in Fig. 3, when said rake is dropped down and said rake-arm 20 and rake-head 21 assume their normal position said teeth 22 are held in a vertical position, as shown in Fig. 1, while collecting the crop on the slatted platform. While I show cog-toothed engaging mechanism between said levers 23 and 24, I do not confine myself to that construction, as it is evident that other means of engagement may be employed and accomplish the same result and come within the scope of my invention. It will be observed that I provide an elongated socket 26, secured to said rake-arm 20 or rake-head 21, as shown in Figs. 3 and 4, so as to allow said rake-arm 20 and rake-head 21 to roll forward and backward, as shown in Fig. 2, when acted upon by the lifting-lever 23, inclining the teeth 22 of said rake-head 21 toward a horizontal direction, as shown in Fig. 2, so that when said rake arm or head is raised the teeth of said rake may pass freely over the accumulated crop when being discharged from the slatted platform as the machine moves forward. While I show said lifting-lever 23 pivotally connected to said supporting-bracket 19, it may be connected to any other part of the machine that will produce the result desired to be accomplished by said lifting mechanism. It will also be observed that when desired to discharge the accumulated cut crop from the slatted platform by means of the lifting mechanism said rake-arm 20 and rake-head 21 are rolled, inclining the point of said teeth 22 in said head 21 rearward toward a horizontal position, as shown in Fig. 2, and said rake-arm 20, head 21, and radius-bar 17 are raised so as to allow the free discharge of the accumulated cut crop from the slatted platform. The grassward end of said rake, which is wholly unsupported, moves in the arc of a circle faster and higher than its stubbleward end, so as to free said rake from the cut crop to be discharged, allowing ample space between said rake and the slats of said platform for the cut crop to be discharged from the slatted platform as the machine moves forward. It will also be observed in my construction that part of the cut crop rests on the ground in rear of the slats of said platform and against the rake, as well as a part of said crop resting on the slatted platform as the machine moves forward and until desired to be discharged by the operator.

My improvements are very desirable for harvesting grain and grass crops where it is desired to cut, gather, and discharge said crops when cut into bunches or windrows in the wake of the machine—such as clover-seed, flax, timothy, buckwheat, oats, &c.—and the cut crop may be deposited in bunches over the field as the machine moves forward, or it may be deposited so as to form windrows transverse to the line of travel of the machine by the operator lifting the rake when opposite the bunch deposited on the preceding swath.

What I claim as my invention, and desire to secure by Letters Patent, is—

1. In a mowing-machine, in combination, a finger-bar, a slatted platform connected to said finger-bar and adapted to continuously slide on the stubble, a rake located at the rear of said platform, an arm of said rake extending stubbleward and pivotally connected to the machine, a radius-bar connected to said arm or head of said rake at the stubbleward side of said platform and extending forward to the main carrying-wheel axle and pivotally connected thereon, a lifting-lever on the machine connected to said rake-arm to raise said rake on said pivots and support it above the ground to discharge the accumulated crop in bunches as the machine moves forward.

2. In a mowing-machine, in combination, a finger-bar, a slatted platform connected to said finger-bar and adapted to slide on the stubble, a vertically-adjustable rake located at the rear of said platform, an arm of said rake pivotally connected to the machine for vertical and rolling adjustment, a lifting-lever on the machine, connected to said rake-arm to raise said rake, the head of said rake adapted to roll in the line of its length to turn the teeth toward a horizontal direction when said rake is raised to discharge the crop as the machine moves forward.

3. In a mowing-machine, in combination, a finger-bar, a slatted platform connected to said finger-bar and adapted to slide on the stubble, and comprising a transverse bar to which the slats of said platform are connected, a guard-shoe extending over the point of a guard-finger and extending rearwardly beneath said finger-bar, a slot in the rearward end of said guard-shoe, a clamping device contacting with the transverse bar of said slatted platform and said finger-bar, to adjustably clamp and hold said cross-bar in its proper working position.

4. In a mowing-machine, in combination, a finger-bar, a main carrying-wheel axle, a slatted platform connected to said finger-bar and adapted to slide on the stubble, a rake located at the rear of said platform, an arm of said rake extending stubbleward and pivotally connected to the machine, a radius-bar runner-like in form and adapted to slide on the stubble, the rearward end of said radius-bar connected to said rake or arm to draw it forward and to hold the teeth of said rake above the ground, said radius-bar pivotally connected to the grassward end of said main carrying-wheel axle, a lever pivotally mounted upon the machine and pivotally connected to said rake-arm to raise said rake and the rearward part of said radius-bar to discharge the crop off said platform as the machine moves forward.

5. In a mowing-machine, in combination, a finger-bar, a slatted platform connected to said finger-bar and adapted to slide on the stubble, a vertically-adjustable rake located at the rear of said platform and mounted for rolling movement, an arm of said rake extending stubbleward and pivotally connected to the machine, a radius-bar, its rearward end connected to said rake head or arm for rolling movement of the head and teeth of said rake, its forward end pivotally connected to the machine, a lifting-lever pivotally mounted upon the machine and pivotally connected to said rake-arm in rear thereof, a lever pivotally connected to the machine, means of engagement between said lever and said lifting-lever to turn and hold the teeth of said rake in a vertical position to gather the crop on said platform, said lifting-lever adapted to roll said teeth toward a horizontal position and raise said rake to pass the teeth over the crop in an oblique direction as the machine moves forward.

6. In a mowing-machine, in combination, a finger-bar, a slatted platform connected to said finger-bar and adapted to slide on the stubble, a vertically-adjustable rake located at the rear of said platform and mounted for rolling movement, an arm of said rake extending stubbleward and pivotally connected to the machine, a radius-bar, its rearward end pivotally connected to said rake head or arm to draw said rake and permit it to roll, the forward end of said radius-bar pivotally connected to the machine on the stubbleward side of said platform, a lifting-lever pivotally connected to the machine to raise said rake, a rearwardly-projecting bracket from said rake-arm to which the rearward end of said lifting-lever is pivotally connected, a lever pivotally connected to the machine and engaging with said lifting-lever, to roll and hold said rake arm and teeth in an opposite direction from the movement imparted to them by said lifting-lever in raising the rake.

7. In a mowing-machine, in combination, a finger-bar, a slatted platform connected to said finger-bar and adapted to slide on the stubble, a vertically-adjustable rake located at the rear of said platform and mounted for rolling movement, an arm of said rake extending stubbleward and pivotally connected to the machine, a radius-bar, its rearward end pivotally connected to said rake head or arm to draw said rake and permit it to roll, the forward end of said radius-bar pivotally connected to the machine on the stubbleward side of said platform, a lifting-lever pivotally connected to the machine and to said rake arm or head, a lever connected to the machine and to said lifting-lever to move said lifting-lever in an opposite direction than when moved to raise said rake-head to hold the teeth of said rake in a vertical position while collecting the crop and when released that said lifting-lever may roll said rake-head and its teeth as being raised to glide over the discharged crop.

In testimony whereof I affix my signature in presence of two witnesses.

WILLIAM N. WHITELY.

Witnesses:
JOHN L. GILLIGAN,
ROBERT WEISKOTTEN.